(12) United States Patent
Al-Mehthel et al.

(10) Patent No.: US 9,266,776 B2
(45) Date of Patent: Feb. 23, 2016

(54) UTILIZATION OF HEAVY OIL ASH TO PRODUCE SELF-CONSOLIDATED CONCRETE

(71) Applicants: Saudi Arabian Oil Company, Dhahran (SA); King Fahd University of Petroleum and Minerals, Dhahran (SA)

(72) Inventors: Mohammed Al-Mehthel, Dhahran (SA); Mohammed Maslehuddin, Dhahran (SA); Fahad R. Al-Dossari, Dammam (SA); Mohammed Rizwan Ali, Al-Khobar (SA); Mohammed Salihu Barry, Thoqba (SA)

(73) Assignee: Saudi Arabian Oil Company (SA)

( * ) Notice: Subject to any disclaimer, the term of this patent is extended or adjusted under 35 U.S.C. 154(b) by 0 days.

(21) Appl. No.: 14/837,956

(22) Filed: Aug. 27, 2015

(65) Prior Publication Data

US 2015/0368156 A1    Dec. 24, 2015

Related U.S. Application Data

(62) Division of application No. 13/673,559, filed on Nov. 9, 2012, now Pat. No. 9,150,455.

(60) Provisional application No. 61/558,279, filed on Nov. 10, 2011.

(51) Int. Cl.
    *C04B 7/02*    (2006.01)
    *C04B 18/08*   (2006.01)
    *C04B 7/26*    (2006.01)

(52) U.S. Cl.
    CPC ........................ *C04B 7/26* (2013.01)

(58) Field of Classification Search
    CPC .................................. C04B 7/02; C04B 18/08
    See application file for complete search history.

(56) References Cited

U.S. PATENT DOCUMENTS

| 3,127,455 A | 3/1964 | Culbertson, Jr. |
| 3,239,472 A | 3/1966 | De Lisle |
| 4,240,952 A | 12/1980 | Hulbert, Jr. |
| 5,108,510 A | 4/1992 | Burge |
| 5,336,317 A | 8/1994 | Beisswenger |
| 7,462,310 B2 | 12/2008 | Ohono |

(Continued)

FOREIGN PATENT DOCUMENTS

| CN | 101823858 A | 9/2010 |
| JP | 2000288531 | 10/2000 |

(Continued)

OTHER PUBLICATIONS

An Introduction to Self-Consolidating Concrete (SCC), Grace Construction Products, Technical Bulletin TB-1500, Cambridge, Massachusetts, pp. 1-6.

(Continued)

*Primary Examiner* — Paul Marcantoni
(74) *Attorney, Agent, or Firm* — Bracewell & Giuliani LLP; Constance Gall Rhebergen; Linda L. Morgan (57) ABSTRACT

A heavy oil ash self-compacting concrete can include aggregate, heavy oil ash fines, water, and cement. The heavy oil ash can include more than 90% carbon, by weight. In an embodiment, the heavy oil ash self-compacting concrete can flow under its own weight and yet maintain a stable mixture consistency.

14 Claims, 3 Drawing Sheets

(56) References Cited

U.S. PATENT DOCUMENTS

| | | |
|---|---|---|
| 7,485,184 B2 | 2/2009 | Hill |
| 8,444,761 B2 | 5/2013 | Al-Mehthel et al. |
| 8,453,584 B2 | 6/2013 | Mori et al. |
| 2006/0278131 A1 | 12/2006 | Hunt |
| 2013/0104779 A1 | 5/2013 | Al-Mehthel et al. |

FOREIGN PATENT DOCUMENTS

| | | |
|---|---|---|
| KR | 2006104518 A | 10/2006 |
| KR | 653311 B1 | 12/2006 |
| KR | 100884355 B1 | 2/2009 |

OTHER PUBLICATIONS

Cement Substitutes: By-products from other manufacturing or electric generating processes can be substituted for cement, National Association of Home Builders Research Center, Jul. 20, 2011, pp. 1-4, www.toolbase.org/TechInventory/TechDetails.aspx . . . .

European Guidelines for Self-Compacting Concrete: Specification, Production and Use, May 2005, pp. 1-68.

Fly Ash Concrete: Inexpensive replacement for Portland cement, National Association of Home Builders Research Center, http://www.toolbase.org/Technology-Inventory/Foundations/fly-ash-concrete, Jul. 20, 2011, pp. 1-3.

Fly Ash in Concrete, Fly Ash Bricks Information, http://flybricksinfo.com/flyash-concrete.html, Jul. 20, 2011, pp. 1-7.

International Search Report for PCT/US2012/063518 mailed Mar. 18, 2013.

Okamura et al. Self-Compacting Concrete, Journal of Advanced Concrete Technology, Japan Concrete Institute, vol. 1, Apr. 2003, pp. 5-15.

Paya et al. Properties of Portland Cement Mortars Incorporating High Amounts of Oil-Fuel Ashes, Waste Management, Elsevier Science Ltd., vol. 19, 1999, pp. 1-7.

Primary Particles Generated by the Combustion of Heavy Fuel Oil and Coal: Review of Research Results from EPA's National Risk Management Research Laboratory, Research Triangle Park, North Carolina, Nov. 2002, pp. 1-56.

What is Silica Fume? Silica Fume Association, http://www.silicafume.org/general-silicafume.html, Nov. 2, 2011, pp. 1-2.

UTILIZATION OF HEAVY OIL ASH TO PRODUCE SELF-CONSOLIDATED CONCRETE

CROSS-REFERENCE TO RELATED PATENT APPLICATIONS

This application is a divisional of, and claims priority to, U.S. patent application Ser. No. 13/673,559, filed on Nov. 9, 2012, which claims priority to U.S. Provisional Patent Application No. 61/558,279, filed on Nov. 10, 2011, the disclosures of which are incorporated herein by reference in their entirety.

BACKGROUND OF THE INVENTION

1. Field of the Invention

The present invention relates to a method and apparatus for producing self-consolidated concrete utilizing heavy oil ash. More specifically, the invention relates to using heavy oil ash as a component of self-consolidated concrete.

2. Description of the Related Art

Conventional concrete can typically have Portland cement and water, plus any of a variety of aggregates such as sand or gravel. Upon mixing, a "hydraulic reaction" occurs between the water and the cement, and the result is a cement paste that binds the aggregates together. In some types of concrete, silica fume or fly ash can be used as a partial replacement or as an addition to the Portland cement. The silica fume and fly ash can react with calcium hydroxide from the cement (pozzolanic reaction). The pozzolanic reaction can increase the strength and density of the concrete after it cures. Unfortunately, these "pozzolans" are relatively expensive and therefore increase the cost of the concrete.

Self-compacting, or self-consolidating, concrete ("SCC") differs from conventional concrete in that it can flow under its own weight. In the late 1980's, SCC was developed to ensure adequate compaction through self-consolidation and facilitate placement of concrete in structures with congested reinforcement and in restricted areas. SCC is a highly workable concrete that is able to flow through narrow gaps and complex structural elements, such as reinforcements, and adequately fill voids without the use of vibration.

A significant quantity of heavy oil ash is produced with the burning of heavy or cracked fuel oil at power generation plants. This quantity is expected to increase as the use of heavy or cracked oil increases. In many instances, this increasing quantity of heavy oil ash must be disposed of in an environmentally friendly manner.

SUMMARY OF THE INVENTION

In view of the foregoing, self-consolidating concrete mixtures that include heavy oil ash, and methods of preparing the heavy oil ash cement concrete mixtures, are provided as embodiments of the present invention.

Oil Ash (OA) is a black powder type of waste material that results from the burning of oil in power generation plants. In some embodiments, OA is used as a filler to produce self-consolidated concrete (SCC). In certain embodiments, 5% OA can be used to produce SCC possessing high strength and good durability; SCC made with OA as an addition to cement has higher compressive strength than SCC made with 7% silica fume or 30% fly ash used as replacement of cement; SCC made with OA as an addition to cement has less drying shrinkage strain than SCC made with 7% silica fume or 30% fly ash used as replacement of cement. The use of OA decreases the cost of SCC compared to similar concretes produced utilizing silica fume or fly ash.

A significant quantity of OA is produced by burning heavy or cracked fuel oil at power generation plants. This quantity is expected to increase with further increases in the use of heavy or cracked oil. Therefore, it is desirable to use this byproduct as a useful material. The utilization of OA in construction materials is an outlet for this byproduct material that can protect the environment and eliminate the need for building special areas to dispose of OA.

Presently, SCC is produced with the use of silica fume or fly ash as a filler. Both fly ash and silica fume are expensive. In some embodiments, the present invention can eliminate or reduce the need for fly ash or silica fume to produce SCC and thus reduce the cost of the SCC. In further embodiments, the requirements for special disposal methods and special dumping areas for OA can be reduced or eliminated. Still further embodiments of the present invention include a safe and economical disposal method for OA. Such disposal methods can reduce the carbon foot print burning associated with heavy or cracked fuel oil by utilizing OA as filler in SCC.

In some embodiments, a heavy oil ash self-compacting concrete includes aggregate; heavy oil ash fines, where the heavy oil ash fines include at least 90% carbon and at least 80% of the heavy oil ash fines being smaller than 45 micrometers (#325 sieve); water; and cement. In certain embodiments, the heavy oil ash cement concrete is the result of the mixing of the water and the cement in the presence of the heavy oil ash fines and aggregate, where the heavy oil ash self-compacting concrete is capable of flowing under its own weight. In further embodiments, the fines are an aggregate that is less coarse than the first mentioned aggregate.

In some embodiments, the heavy oil ash self-compacting concrete is substantially free of superplasticizers. In further embodiments, the concentration of heavy oil ash equals about 3%-10% of the weight of the cement. In still further embodiments, the concentration of heavy oil ash equals about 5% of the weight of the cement. In certain embodiments, the heavy oil ash fines are substantially free of cementitious properties. In some embodiments, the cement releases calcium hydroxide after reacting with water and has an absence of a reaction between the calcium hydroxide and the heavy oil ash. In further embodiments, the heavy oil ash self-compacting concrete is a homogenous mixture and is operable to remain homogenous while flowing. In certain embodiments, the heavy oil ash self-compacting concrete is operable to have a slump flow diameter of at least about 650 mm. In some embodiments, the water absorption of the heavy oil ash cement concrete mixture, after a cure time of 28 days, is between about 4.50% and 4.60%.

In some embodiments, a method for disposing of heavy oil ash include the steps of mixing cement and water to form a cement mixture; adding heavy oil ash to the cement mixture, the heavy oil ash being produced by the combustion of heavy fuel oil; and adding aggregate to the cement mixture, the cement mixture, heavy oil ash, and aggregate creating a heavy oil ash self-compacting concrete is provided. In certain embodiments of the method, the heavy oil ash includes at least 90% carbon. In further embodiments of the method, the cement releases calcium hydroxide after reacting with the water, and there is an absence of a reaction between the calcium hydroxide and the heavy oil ash.

In some embodiments, the method includes the step of curing after the heavy oil ash self-compacting concrete is mixed to produce a hardened self-compacting concrete, wherein the heavy oil ash prevents an ingress of water into the hardened self-compacting concrete. Further embodiments of the method also include the step of pouring the self-compacting concrete into a cone and then removing the cone, wherein the self-compacting concrete flows into a circle having a diameter of 650 mm-800 mm. In still further embodiments of the method, the amount of heavy oil ash added is equal to about 1% by weight to about 10% by weight of the amount of the cement.

BRIEF DESCRIPTION OF THE DRAWINGS

So that the manner in which the above-recited features, aspects and advantages of the invention, as well as others that will become apparent, are attained and can be understood in detail, more particular description of the invention briefly summarized above can be had by reference to the embodiments thereof that are illustrated in the drawings that form a part of this specification. It is to be noted, however, that the appended drawings illustrate some embodiments of the invention and are, therefore, not to be considered limiting of the invention's scope, for the invention can admit to other equally effective embodiments.

DETAILED DESCRIPTION OF THE INVENTION

Heavy oil ash is residue resulting from the combustion of heavy oil or cracked oil. Heavy oil is generally defined as fuel oil having relatively long hydrocarbon chains such as, for example, carbon lengths of between about 12-70 carbon atoms or between about 20-70 carbon atoms. Heavy fuel oil can be classified as "No. 5 fuel oil" or "No. 6 fuel oil" by the American Society for Testing and Materials (ASTM). Due to its high viscosity, heavy fuel oil is sometimes preheated before combustion in, for example, a power generation plant.

"Cracking" in the oil refining industry generally refers to breaking down complex organic molecules into simpler molecules by breaking (or cracking) long-chain hydrocarbons into shorter hydrocarbon chains. Various processes can be used to crack oil including, for example, catalytic processes. After the cracking process, the resulting hydrocarbons can be separated into various types of fuel, including, for example, fuel gas, liquefied petroleum gas ("LPG"), gasoline, light cycle oils, and heavy fuel oil. The heavy fuel oil produced by the cracking process can be referred to as "cracked fuel oil." For the purposes of this application, cracked fuel oil and heavy fuel oil are both referred to as heavy fuel oil, unless otherwise specified. Electricity production plants can use heavy fuel oil for power generation and are expected to use increasing quantities of heavy fuel oil in the future. The combustion of heavy fuel oil produces residue, including ash. As one of ordinary skill in the art will appreciate, the heavy oil ash can, and to some extent must due to certain environmental restrictions, be captured rather than released into the atmosphere.

Heavy oil ash ("HOA") is a black powdery type of waste material that results from burning of heavy fuel oil. Heavy oil ash has unique characteristics as compared to other types of ash. Typically, heavy oil ash includes more than about 90% by weight carbon. The remaining less than about 10% by weight of the heavy oil ash can frequently include sulfur, magnesium, and vanadium. Heavy oil ash can include various particle sizes.

Heavy oil ash contains various elements. For example, Table 1 presents a typical chemical analysis of HOA. The amounts of each element can vary depending upon the source of the heavy oil ash. The HOA used in some embodiments of the present invention can contain more than about 90 wt. % carbon because it is formed by burning heavy oils. As can be seen in Table 1, the elemental composition of the HOA used in embodiments of the present invention is substantially different than that of traditional fly ash that has been previously used in concrete.

TABLE 1

| Elemental composition of one embodiment of HOA | |
|---|---|
| Element | Weight, % |
| Carbon | 92.5 |
| Magnesium | 0.79 |
| Silicon | 0.09 |
| Sulfur | 5.80 |
| Vanadium | 0.61 |

Unlike HOA, traditional fly ash is generally produced by burning coal. The main chemical components of traditional fly ash are silicon dioxide ($SiO_2$), aluminum oxide ($Al_2O_3$), and iron oxide ($Fe_2O_3$) in accordance with ASTM C618. Fly ash is generally categorized by the type of coal burned. For example, class F fly ash is produced by burning anthracite and bituminous coal, while Class C fly ash is produced by burning lignite or sub-bituminous coal. In contrast, HOA, being at least 90% carbon, contains less than 10 wt. % silicon dioxide, aluminum oxide, and iron oxide, combined. In some embodiments, HOA contains less than 1 wt. % silicon dioxide, aluminum oxide, and iron oxide, combined.

Silica fume is a byproduct from the production of silicon metal or ferrosilicon alloys. Silica fume generally includes amorphous silicon dioxide ($SiO_2$). The individual silica fume particles are much smaller than cement particles and have a relatively large surface area. The ASTM C 1240 and AASHTO M307 standards specify the quality of silica fume.

Concrete is a composition made from cement, water, and aggregate or aggregates. While "aggregate" can be plural, the term "aggregates" generally refers to more than one type or more than one size of aggregate. Cement is a binder that can bind the aggregates together. Ordinary Portland cement ("OPC") is one such binder that can bind to other materials, such as fine and coarse aggregates, thereby holding them together. A material that is a paste that can harden to bind materials together, in the manner of cement, is said to be a cementitious material or to have cementitious properties. One of skill in the art will appreciate that water can be added to dry cement to make cement paste. The water-cement ratio ("w/c ratio") of OPC is typically between about 0.25 and 0.5. By way of explanation, a w/c ratio of 0.25 indicates that there is one part water to four parts Portland cement (¼=0.25). A w/c ratio of 0.5 indicates one part water to two parts cement.

As one of ordinary skill in the art will appreciate, various types of conventional aggregates can be used as a filler in the concrete. Aggregates can include, for example, sand, gravel, crushed rock, slag, or any other type of aggregate. When aggregates are used in concrete, the cement generally coats them and then binds them together in a matrix. When various sizes of aggregate are used, the smaller aggregate materials can fill voids between the larger aggregate materials, thus creating a more dense matrix. The aggregates used in concrete can be defined in terms of coarse aggregates and fine aggregates. Fine aggregates, also referred to as "fines," can include natural sand, crushed stone, or other suitable fine particles, with most particles smaller than 5 mm. Coarse aggregates generally include gravel or crushed stone with particles predominantly larger than 5 mm and typically between 9.5 mm and 37.5 mm.

A pozzolan is a finely divided siliceous material or siliceous/aluminous material that reacts chemically with slaked lime (calcium hydroxide) at ordinary temperatures and in the presence of moisture to form a calcium silicate hydrate or other cementitious compounds. A material that has such pozzolanic properties is considered to be a pozzolan. Fly ash and silica fume are pozzolans. When fly ash or silica fume is used in concrete, in conjunction with Portland cement, it can contribute to the properties of the hardened concrete through hydraulic or pozzolanic activity, or both. Therefore, fly ash or silica fume can be used in concrete as an additive or partial replacement of cement.

When cement is mixed with water, chemical reactions cause the cement to crystallize and the crystals interlock the aggregates, thereby giving strength to the resulting concrete. During this reaction, lime (calcium hydroxide) can become available within the concrete. It is this lime that can react with fly ash to give concrete increased strength. Over time, lime in the cement reacts with fly ash to fill the pores in the concrete and to further bind the concrete. The strength of concrete is often measured at 28 days because of the additional strength developed over the first 28 days as the fly ash reacts with the lime.

The standards controlling fly ash for use as a pozzolanic material are defined by ASTM C618. In particular, the carbon content, measured by the loss on ignition ("LOI") should be less than 6% or 4%, depending on the governing body. Because of the pozzolanic properties, it is common to make concrete wherein 30% or more of the Portland cement is replaced with fly ash. Similarly, silica fume, also having pozzolanic properties, can be used as a cement binder in concrete. In contrast, the LOI of HOA is often greater than 60%.

Self-compacting concrete ("SCC") is a concrete mixture that can be described as a high performance material which flows under its own weight. The term "flowability" is defined as the ease of flow of fresh concrete in an unconfined space. SCC is characterized by a high flowability, which allows it to flow under its own weight. Conventional concrete, in contrast, must be worked and molded into position. Unlike conventional concrete, SCC does not require vibrators to achieve consolidation and, thus can completely fill formworks, including areas of limited access, such as narrow gaps between reinforcement bars. The high flowability of SCC makes it possible to fill the formwork without vibration.

The flowability of SCC can be measured by a variety of techniques. One such technique is called the "slump-flow" test. The slump-flow test includes filling a cone with a predetermined amount of the SCC, and removing the cone, as described in EN 12350-2. Unlike measuring the slump of conventional concrete, the SCC will flow under its own weight into a generally circular pattern. The slump-flow test is scored by measuring the largest diameter of the flow pattern. This test is described in detail in Exhibit B of The European Guidelines for Self-Compacting Concrete, May 2005, which is incorporated herein by reference.

The constituent materials used for the production of conventional SCC are the same as those for conventionally vibrated normal concrete except that conventional SCC contains a lesser amount of coarse aggregates and a larger amount of fines (cement and filler particles smaller than 0.125 mm) and can include a special plasticizer to enhance flowability. Fly ash, glass filler, limestone powder, silica fume, etc. are used as filler materials in conventional SCC. In conventional SCC, high flowability and high segregation resistance of SCC can be obtained by using: (i) a larger quantity of fine particles, i.e. a limited aggregate content (coarse aggregate: 50% of the concrete volume and sand: 40% of the mortar volume); (ii) a low water/powder ratio; and (iii) a higher dosage of superplasticizer and stabilizer. A stabilizer can be used in SCC mixes for maintaining proper cohesiveness so that highly flowable SCC does not segregate. In general, SCC is so flowable that a slump test would result in at least a 280 mm (11 in.) slump but also maintain stability. In this case, stability means resistance to segregation, separation, bleeding, excessive air migration, or past separation. SCC must therefore be able to flow under its own weight, but have a high enough viscosity to suspend aggregate particles within the cement matrix. Silica fume and fly ash are normally use to improve the flow properties of conventional SCC. The EFNARC (European Federation of National Associations Representing producers and applicators of specialist building products for Concrete) has published guidelines for SCC as the "Specification and Guidelines for Self-Compacting Concrete," dated February 2002 ("EFNARC Guidelines"). Similarly, the Self-Compacting Concrete European Project Group published "The European Guidelines for Self-Compacting Concrete," dated May 2005 ("European Guidelines"). Both of these documents are incorporated herein by reference.

In an embodiment of the present invention, HOA is added to a concrete mixture to create a self-compacting concrete. In this embodiment, the HOA contributes to the flowability and suspension characteristics of the concrete mixture to develop or enhance self-consolidating properties. In various embodiments, the SCC concrete of the present invention can include cement, water, heavy oil ash, and aggregates to create "heavy oil ash self-compacting concrete" or HOA SCC. In some embodiments, the heavy oil ash contains more than about 90 wt. % carbon. In one embodiment, about 16% by weight of the heavy oil ash is retained on a #325 sieve, while about 84% by weight of the material passes through the #325 sieve. This indicates that about 84% by weight of the ash can be finer (smaller) than about 45 micrometers. In some embodiments, no processing of the HOA is required prior to using it in the HOA cement concrete. In some embodiments, no processing to reduce the carbon content is required or used.

Some embodiments of HOA SCC meet the requirements of either or both the EFNARC Guidelines or the European Guidelines, except to the extent that those standards do not allow the use of high-carbon content materials. In particular, various embodiments of SCC, each having from about 1% to about 10% HOA, can meet each of the following guidelines, as defined by Table A.6 of the European Guidelines, reproduced here as Table 2:

TABLE 2

| Category | Property | Criteria |
| --- | --- | --- |
| Slump-flow | Slump-flow class SF1 | ≥520 mm, ≤700 mm |
| | Slump-flow class SF2 | ≥640 mm, ≤800 mm |
| | Slump-flow class SF3 | ≥740 mm, ≤900 mm |
| | Slump-flow class specified as a target value | ±80 mm of target value |
| V-funnel | V-funnel class VF1 | ≤10 seconds |
| | V-funnel class VF2 | ≥7 seconds, ≤27 seconds |
| | V-funnel class specified as a target value | ±3 seconds |
| L-box | L-box class PA1 | ≥0.75 |
| | L-box class PA2 | ≥0.75 |
| | L-box specified as a target value | Not more than 0.05 below the target value |
| Sieve Segregation Resistance | Sieve segregation resistance SR1 | ≤23% |
| | Sieve segregation resistance SR2 | ≤18% |

In some embodiments, HOA SCC can include plasticizers or superplasticizers such as, for example, polycarboxylate superplasticizers. In certain embodiments, the HOA SCC can be free of any plasticizers or superplasticizers. In further embodiments, HOA SCC can include viscosity modifying agents to increase plastic viscosity and thus prevent segregation. In still further embodiments, the HOA SCC can be free of any viscosity modifying agents.

In some embodiments, the HOA can be introduced into the concrete mix when the concrete mix is prepared. In further embodiments, voids, gaps, or pores (collectively referred to as "pores") can exist within the concrete matrix, and substantially all or at least a portion of the pores can be filled with HOA fines. In still further embodiments, HOA SCC does not include or is at least substantially free of fly ash or silica fume. In certain embodiments, fly ash or silica fume can be included in addition to the HOA. In some embodiments, the heavy oil ash does not have cementitious or pozzolanic properties. Indeed, the HOA generally does not react with calcium hydroxide, or lime. In certain embodiments, the LOI of HOA is greater than 60%. In further embodiments, the LOI of HOA is greater than 75%. In still further embodiments, the LOI of HOA is greater than 85%.

In some embodiments, the amount of HOA equals about 5%, by weight, of the cement. In certain embodiments, the SCC can include about 1-10% HOA, Portland cement, aggregate (coarse aggregate, fine aggregate, or a combination thereof) and water.

In some embodiments, HOA can be used as an addition to Portland cement. In this embodiment, the compressive strength of the resulting HOA SCC can be higher than the compressive strength of SCC when cement is replaced with 7% silica fume or 30% fly ash. In certain embodiments, where HOA is used as an addition to Portland cement, the resulting HOA SCC has less drying shrinkage strain than that of SCC when cement is replaced with 7% silica fume or 30% fly ash. In further embodiments, up to 10% by weight of the Portland cement can be replaced with heavy oil ash. In some embodiments, about 3%-6% of the cement is replaced with HOA.

One embodiment can be based on concrete having 2 parts water and 5 parts cement, thus having a w/c ratio of 0.4. In this embodiment, however, approximately 5% of the cement is replaced with HOA. Due to the replacement, the composition of the mixture is approximately 8 parts water, 19 parts cement, and 1 part HOA. The w/c of this embodiment is 0.421. In some embodiments, the w/c ratio can be approximately 0.42 to 0.44. In certain embodiments, the weight of the HOA can equal approximately 5%-10% of the weight of the Portland cement.

In an alternate embodiment, a concrete mixture having a composition that includes approximately 4 parts water, 10 parts cement, and 1 part HOA is provided, thus having a w/c ratio of about 0.4. The composition can include HOA that has been added in an amount up to about 10% by weight of the cement, for example OPC, or in certain embodiments between about 5% and 10% by weight of the cement. In one embodiment, an amount of HOA equal to 5% wt. of the weight of the Portland cement is added to the concrete mixture.

In one embodiment, the HOA can reduce the ingress of fluid into the HOA SCC. For example, the HOA can act to fill pores within the concrete matrix of the SCC, thereby reducing or preventing fluid from penetrating into the HOA SCC. In one embodiment, the HOA can reduce water absorption in SCC. Furthermore, by reducing or preventing the ingress of fluid within the SCC concrete matrix, corrosive fluids can have less of an effect on the HOA SCC. Components such as rebar that are encased in the HOA SCC can therefore be protected from corrosion. The rate of corrosion of reinforcing components or members in HOA SCC can be lower than the rate of corrosion for ordinary Portland cement concrete. Also, the onset of corrosion can be delayed as compared to other forms of concrete. Furthermore, the corrosion potential of HOA SCC can be lower than the corrosion potential of ordinary Portland cement concrete.

The HOA can be introduced into the concrete mix at the time of preparing the concrete mixture. The HOA can be introduced into the cement mixture as a fine powder. In one embodiment, the HOA and the HOA SCC need not be heated prior to or during preparation. In one embodiment, the HOA need not be mixed with chlorine. In one embodiment, the cement content in the concrete mixture can be about 20%-30% by weight.

In addition to producing SCC with desirable properties, the use of HOA to make SCC is a useful way to dispose of otherwise unwanted HOA. Indeed, rather than placing HOA in a landfill or other container, the HOA is disposed of by producing HOA SCC with the properties described herein.

EXAMPLES

Table 3 shows the cement, water and ash contents of various mixtures of conventional SCC and HOA SCC. In embodiments defined as "Replacement," the defined percentage of HOA is used to replace the same amount, by weight, of Portland cement. Because that percentage of Portland cement has been removed, the w/c ratio is increased. In embodiments defined as "Addition," the HOA is added to the mixture and, thus, the w/c ratio is not changed.

TABLE 3

| | Mix Detail | | |
| --- | --- | --- | --- |
| Mix designation | % of Additive Ash (Replaced/Added) | w/c Ratio | Cement content, kg/m³ |
| 7% silica fume-Replace | 7% silica fume-Replacement | 0.4 | 450 |
| 30% fly ash-Replace | 30% fly ash-Replacement | 0.4 | 450 |
| 5% HOA Add | 5% HOA-Addition | 0.4 | 450 |

The flow properties of SCC prepared with 7% silica fume, 30% fly ash and 5% HOA are summarized in Table 4. The flow properties of all the mixes were within the required values. Of particular interest is the flow of 5% HOA SCC, which shows flow properties within the limits. As shown in Table 4, an HOA SCC made with 5% HOA, that is substantially free of silica fume and fly ash, can meet various requirements for self-compacting concrete such as the requirements established by the EFNARC Specification & Guidelines for Self-Compacting Concrete (February 2002). One embodiment of HOA SCC can have a slump-flow diameter of greater than about 650 mm and less than about 800 mm. In some embodiments, the slump flow diameter can be greater than about 750 mm. In certain embodiments, the slump flow diameter can be equal to about 760 mm. Similarly, HOA SCC that is substantially free of silica fume and fly ash can have a V-funnel time that is between about 6 seconds and about 12 seconds. In further embodiments, the V-funnel time can be about 10 seconds. HOA SCC that is substantially free of silica fume and fly ash can have an L-box (H2/H1) between about 0.8 and about 1.0 and a U-box (H2-H1) between about 0 mm to about 30 mm. In some embodiments, 5% HOA that is substantially free of silica fume and fly ash can have a V-funnel time of about 10 seconds, an L-box measurement of about 0.87, and a U-box measurement of about 6 mm.

TABLE 4

Flow properties of SCC prepared with silica fume, fly ash, and HOA.

| Mix details | Slump flow dia, | V-funnel time, | L-box (H2/H1) | U-box (H2-H1), mm |
|---|---|---|---|---|
| 7% silica fume-Replacement | 790 | 7 | 0.98 | 3 |
| 30% fly ash-Replacement | 760 | 7 | 1.0 | 10 |
| 5% HOA-Addition | 760 | 10 | 0.87 | 6 |
| Limiting values | 650-800 | 6-12 | 0.8-1.0 | 0-30 |

Figure 1:
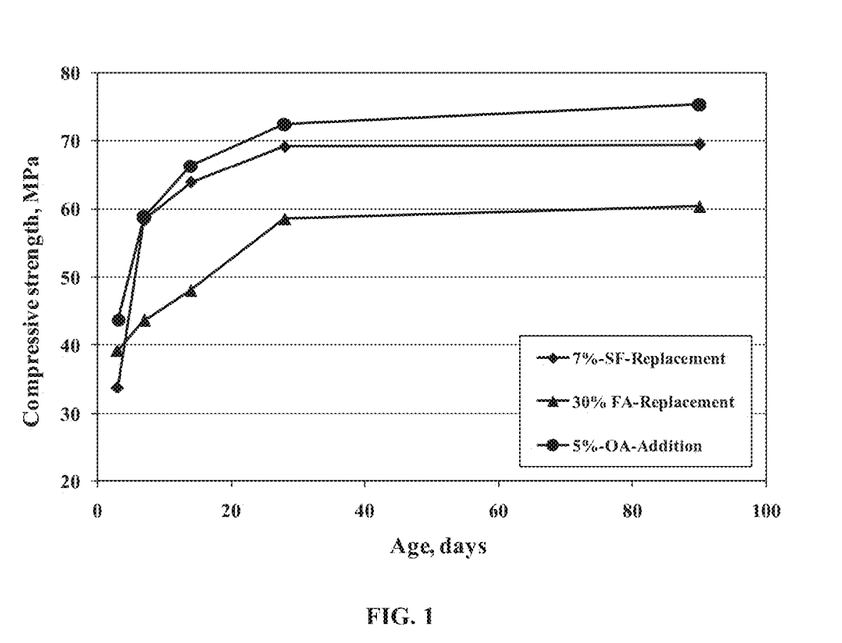
FIG. 1 is a graph showing the compressive strength development of an embodiment of the present invention, compared to conventional embodiments.

FIG. 1 shows the compressive strength development in SCC with HOA, fly ash, and silica fume. Specifically, FIG. 1 shows the compressive strength development of SCC specimens each prepared with 7% silica fume as a replacement of cement, 30% fly ash as a replacement of cement, or 5% HOA used in addition to cement. The compressive strength increased in all the concrete specimens with age. In one embodiment, the compressive strength of SCC prepared with HOA was greater than about 70 MPa. Furthermore, the compressive strength of this embodiment was greater than the compressive strength of SCC prepared with either silica fume or fly ash.

Figure 2:
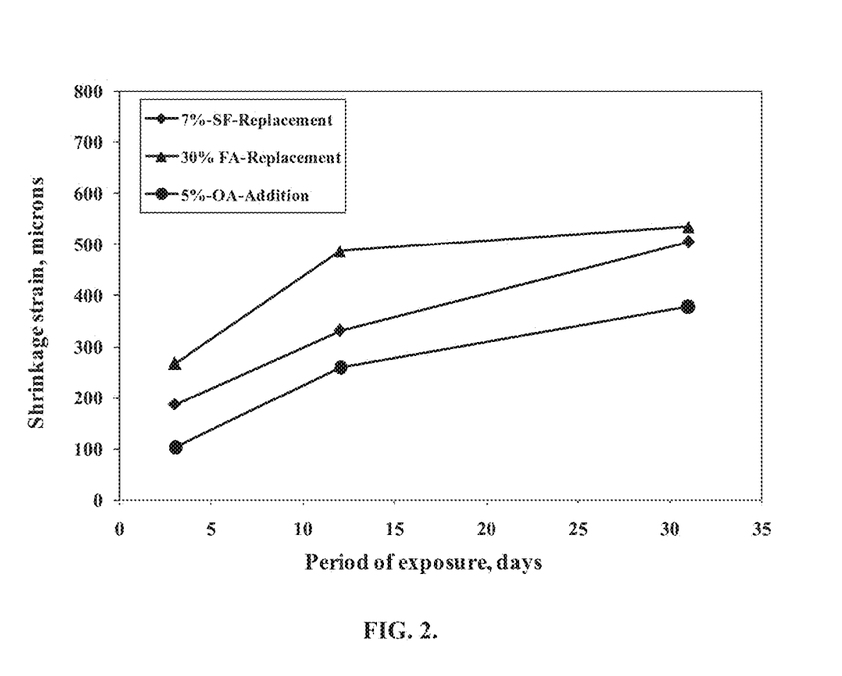
FIG. 2 is a graph showing drying shrinkage of an embodiment of the present invention, compared to conventional embodiments.

The drying shrinkage strain in the SCC specimens prepared with HOA, fly ash or silica fume is depicted in FIG. 2. Specifically, the drying shrinkage strains are shown for SCC specimens each prepared with 7% silica fume as a replacement of cement, 30% fly ash as a replacement of cement, or 5% HOA used in addition to cement. As expected, the drying shrinkage strain increased with age in all the concrete specimens. The drying shrinkage of SCC incorporating HOA was less than that of fly ash or silica fume specimens.

Figure 3:
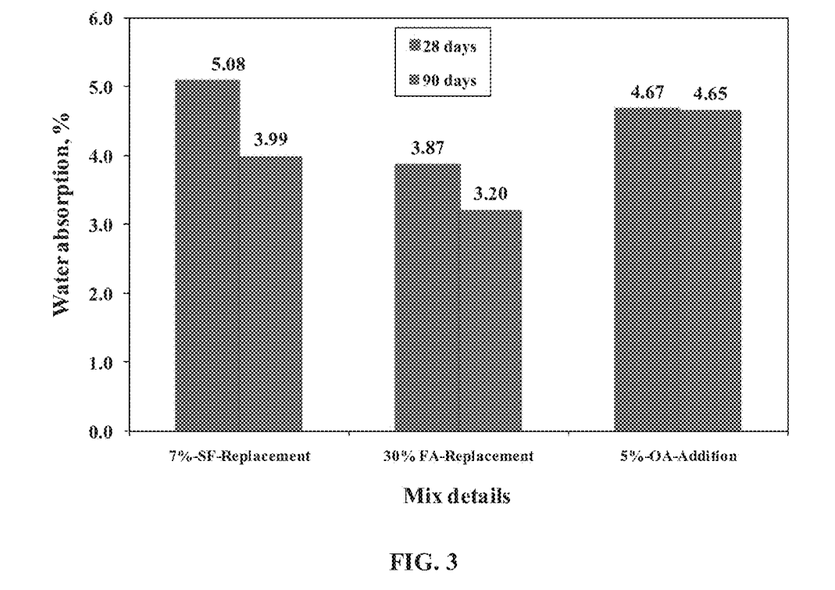
FIG. 3 is a graph showing water absorption of an embodiment of the present invention, compared to conventional embodiments.

The water absorption in the SCC specimens prepared with HOA, fly ash, or silica fume is depicted in FIG. 3. Specifically, the water absorption is shown for SCC specimens each prepared with 7% silica fume as a replacement of cement, 30% fly ash as a replacement of cement, or 5% HOA used in addition to cement. After 28 days of curing, the water absorption values for all specimens were in the range of 3.87% to 5.60%. The water absorption values for all specimens after 90 days of curing were in the range of 3.20% to 5.44%. Least water absorption was noted in the 30% fly ash cement concrete specimens followed by 5% HOA cement concrete specimens. The water absorption of SCC with 5% HOA is comparable with other SCC mixes. Specifically, in one embodiment, the water absorption of HOA SCC can be between about 4.00 and 5.00. In one embodiment, the water absorption of HOA SCC can be between about 4.40 and 4.80. In one embodiment, the water absorption of HOA SCC can be between about 4.50 and 4.60. In one embodiment, the water absorption of HOA SCC, after 28 days, can be about 4.67, and after 90 days, can be about 4.65.

Figure 4:
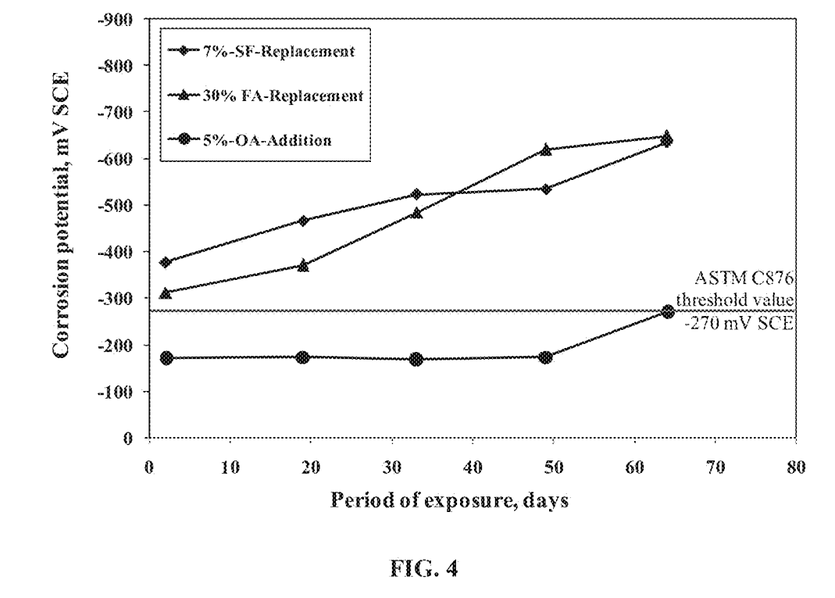
FIG. 4 is a graph showing corrosion potentials of an embodiment of the present invention, compared to conventional embodiments.

The corrosion potentials on steel in the SCC specimens prepared with HOA, fly ash or silica fume are depicted in FIG. 4. Specifically, the corrosion potentials on steel are shown for SCC specimens each prepared with 7% silica fume as a replacement of cement, 30% fly ash as a replacement of cement, or 5% HOA used in addition to cement. The potentials were less than the threshold value in the SCC specimens prepared with 5% HOA. The horizontal line in FIG. 4 indicates the ASTM C876 threshold value of −270 mV SCE.

Figure 5:
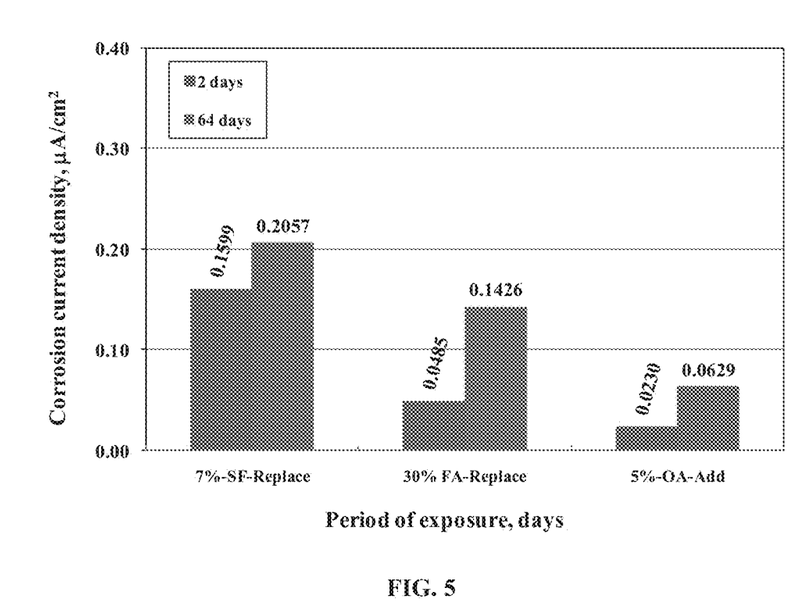
FIG. 5 is a graph showing corrosion current density of an embodiment of the present invention, compared to conventional embodiments.

The corrosion current density on steel in the SCC concrete specimens prepared with HOA, fly ash or silica fume is depicted in FIG. 5. Specifically, the corrosion current density on steel is shown for SCC specimens prepared with 7% silica fume as a replacement of cement, 30% fly ash as a replacement of cement, or 5% HOA used in addition to cement. The corrosion current density was measured up to 64 days following exposure to the chloride solution. The corrosion current density of SCC with 5% HOA was less than that in the fly ash or silica fume cement concrete.

The data in FIGS. 1 through 5 indicate that the mechanical properties and durability characteristics of 5% HOA SCC were generally better than those of SCC specimens prepared with silica fume or fly ash. This indicates that 5% HOA can be used to produce SCC possessing high strength and good durability.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within the said range.

Throughout this application, where patents or publications are referenced, the disclosures of these references in their entireties are intended to be incorporated by reference into this application, in order to more fully describe the state of the art to which the invention pertains, except when these reference contradict the statements made herein.

What is claimed is:
1. A method of disposing heavy oil ash comprising the steps of:
  mixing Portland cement and water to form a cement mixture;
  adding to the cement mixture heavy oil ash fines, wherein the heavy oil ash fines comprise at least 90% carbon and at least 80% of the heavy oil ash fines being finer than 45 microns (#325 sieve), wherein the heavy oil ash fines do not have cementitious or pozzolanic properties and do not react with lime; and adding pozzolanic aggregate create a heavy oil ash self-compacting concrete that is capable of flowing under its own weight.

2. The method of claim 1, wherein the cement releases calcium hydroxide after reacting with the water, and further comprising an absence of a reaction between the calcium hydroxide and the heavy oil ash.

3. The method of claim 1, further comprising the step of curing, after the heavy oil ash self-compacting concrete is mixed, to produce a hardened self-compacting concrete, wherein the heavy oil ash prevents an ingress of water into the hardened self-compacting concrete.

4. The method of claim 1, further comprising the step of pouring the heavy oil ash self-compacting concrete into a cone and then removing the cone, wherein the self-compacting concrete flows into a circle having a diameter of 650 nm to 800 mm.

5. The method of claim 1, wherein the heavy oil ash is equal to 1% to 10% by weight of the self-compacting concrete.

6. The method of claim 1, wherein the heavy oil ash is equal to 5% by weight of the self-compacting concrete.

7. The method of claim 6, wherein the self-compacting concrete comprising 5% by weight heavy oil ash reduces the corrosion current density of steel in the self-compacting concrete.

8. The method of claim 7, wherein the corrosion current density value of steel in the heavy oil ash self-compacting concrete is between −170 mV and −230 mV.

9. The method of claim 6, wherein the cement mixture comprising 5% by weight heavy oil ash reduces the corrosion current density of steel in the heavy oil ash self-compacting concrete.

10. The method of claim 1, wherein the heavy oil ash self-compacting concrete is characterized by a water absorption percentage of between 4.50% and 4.60%.

11. The method of claim 1, wherein the heavy oil ash self-compacting concrete is substantially free of fly ash or silica fume.

12. The method of claim 1, wherein the heavy oil ash does not react with calcium hydroxide or lime.

13. The method of claim 1, wherein the heavy oil ash comprises less than 10% by weight of sulfur, magnesium and vanadium.

14. The method of claim 1, further comprising adding a second aggregate to the cement mixture following the addition of the first aggregate.

* * * * *

UNITED STATES PATENT AND TRADEMARK OFFICE
CERTIFICATE OF CORRECTION

| | |
|---|---|
| PATENT NO. | : 9,266,776 B2 |
| APPLICATION NO. | : 14/837956 |
| DATED | : February 23, 2016 |
| INVENTOR(S) | : Mohammed Al-Mehthel et al. |

It is certified that error appears in the above-identified patent and that said Letters Patent is hereby corrected as shown below:

Claims

In Column 11, Line 4, Claim 1, the phrase "aggregate create" should read --aggregate to create--.

Signed and Sealed this
Tenth Day of May, 2016

Michelle K. Lee
*Director of the United States Patent and Trademark Office*